United States Patent [19]

Hill et al.

[11] 4,293,072

[45] Oct. 6, 1981

[54] STACKABLE EQUIPMENT CONTAINERS

[75] Inventors: David A. Hill; Abraham Lomnitzer, both of Johannesburg, South Africa

[73] Assignee: Qualetron (PTY) Ltd., Germiston, South Africa

[21] Appl. No.: 68,353

[22] Filed: Aug. 21, 1979

[30] Foreign Application Priority Data

Aug. 23, 1978 [ZA] South Africa ............... 78/4787

[51] Int. Cl.³ .................................................. B65D 21/02
[52] U.S. Cl. ............................. 206/512; 206/821; 206/509; 312/211
[58] Field of Search ............... 206/504, 509, 511, 512, 206/821; 220/23.4, 23.6; 312/211; 34/268

[56] References Cited

U.S. PATENT DOCUMENTS

| 224,486 | 2/1880 | Spruce | 220/23.4 |
|---|---|---|---|
| 1,472,676 | 10/1923 | Rhoads | 34/238 |
| 2,975,930 | 3/1961 | Pennington | 220/23.4 |
| 3,159,436 | 12/1964 | Davis | 206/511 |
| 3,424,334 | 1/1969 | Goltz | 206/511 |
| 3,506,321 | 4/1970 | Hanpel | 220/23.4 |
| 3,584,738 | 6/1971 | Wallace | 220/23.6 |
| 3,737,031 | 6/1973 | Carroll | 206/511 |
| 4,155,452 | 5/1979 | Wetterman | 206/519 |

FOREIGN PATENT DOCUMENTS 2623923 12/1976 Fed. Rep. of Germany ..... 220/23.4

Primary Examiner—George E. Lowrance
Attorney, Agent, or Firm—Mark Dryer

[57] ABSTRACT

A stackable container comprises grooved upper and lower sides. The sides of the grooves are undercut. In the grooves of the lower sides are four hooks each having base which fits a groove, a flexible leg and a nose at the end of the leg to engage the undercut side of the groove in the upper side of an identical container. A supporting boss may be provided extending to above the leg, so that the container will be supported on the bosses.

27 Claims, 5 Drawing Figures

STACKABLE EQUIPMENT CONTAINERS

This invention relates to equipment containers and in particular, although not exclusively, to containers for electronic equipment.

When using electronic equipment for testing and educational purposes, often a number of items of equipment are required. Such items can take up a substantial amount of bench space. It is, therefore, desirable that these items can be safely stacked so as to reduce the space taken by them. Such stacking can take place by simply placing one container on another. This, however, is dangerous as the containers can move relative to one another and the stack can collapse so that one or more containers fall and are damaged. Another way is to use a construction including racks or the like. This has disadvantages both of cost and inflexibility.

Another means of stacking is provided by having legs on the underside of the container and recesses on opposite sides into which the legs can be received, the containers resting one on the other and being prevented from lateral movement by the interengagement of the legs and recesses. This provides a considerable improvement on the use of a rack. However, the containers will not be firmly held together and two or more containers cannot be lifted as a unit from above as the interconnection is such that relative vertical movement is not restrained.

Two embodiments of the invention will now be described by way of example with reference to the accompanying drawings.

Figure 1:
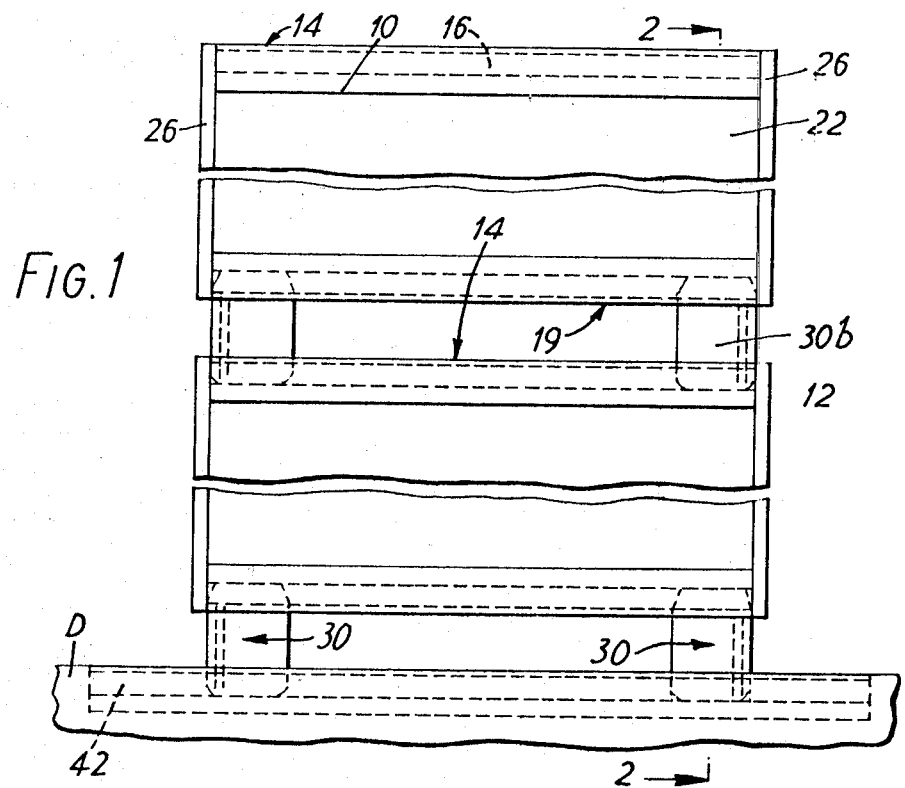
FIG. 1 is a diagrammatic view of a stack of two containers of the invention on a desk.

Referring now to FIG. 1, there is shown on a desk or bench D a stack of two containers 10 and 12, the former (10) being located above the latter. Both the containers are of identical rectangular parallelipipedical shape and size.

Figure 2:
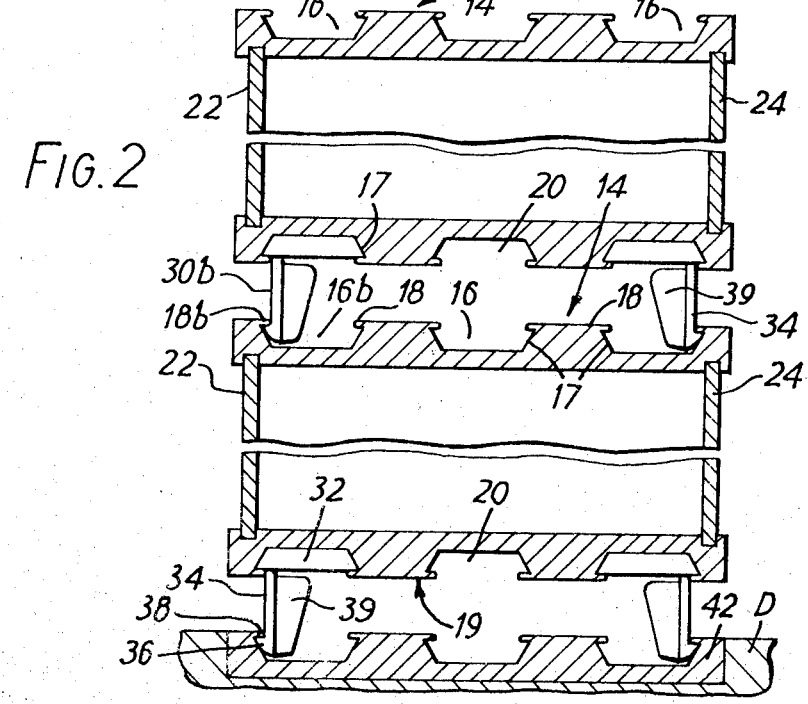
FIG. 2 is a section on line 2—2 of FIG. 1.

The upper side 14 of each container comprises 2 or more grooves 16 running along its entire length (see FIG. 2), each groove 16 having inclined undercut sides 17, so that the sides have inwardly directed lips 18 and so that the area bounded by the sides and base of the groove is approximately in the shape of an inverted dovetail "T".

The underside 19 of each container is of identical construction and the grooves 20 therein are located so that these lie exactly above the grooves 16 of the upper side 14. The containers 10 and 12 each further comprise a front panel 22 and a rear panel 24 as well as two side panels 26 which extend to the upper and lower surfaces respectively of the sides 14 and 19 thus closing off the ends of the grooves 16 and 20. These side panels 26 are held in position by bolts or the like so as to be removable from the container if the need arises.

In each of the two outermost grooves 20 there is provided a pair of injection moulded plastic engagement hooks 30. Each hook 30 comprises: (a) flat a base 32 which has parallel sides and is preferably square in plan and which is slidably received within the groove 20 and extending below the lips thereof (b), a leg of narrow elongated cross-section 34 upstanding from the base 32 near one side thereof and extending in the direction of the groove i.e. parallel to the said parallel sides, (c) a nose 36 running along the length of the upper edge of the leg 34 and having a flat undersurface 38 and (d) a reinforcing wing 39 extending along the leg 34 from its upper edge and terminating short of the base 32.

Figure 3:
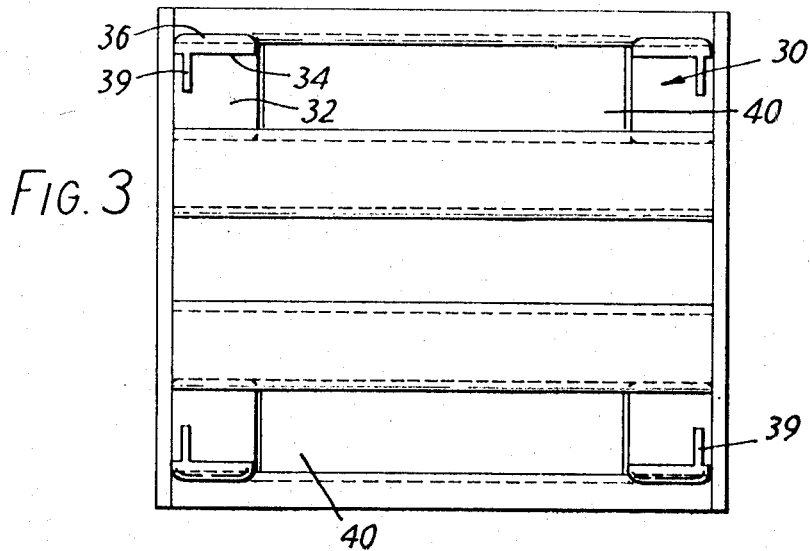
FIG. 3 is an underplan of one of the containers.

The leg 34 stands slightly out of the vertical extending towards the edge of the base at its upper end. When the hook is in position in a stacked container as described and shown in FIGS. 1, 2 and 3, the leg will lie perpendicular to the base 32. The sides 32a of the base 32 are inclined upwardly at the same angle as the sides of the grooves 16 and 17. Thus the section of the base parallel to any side is in the form of the frustum of an isosceles triangle. The face of the base from which the leg 34 rises is wider than the lower face of the base 32. The width of the base is greater than the distance between facing noses 18 of each groove.

An elongated spacer 40 is contained within each outermost groove 20 to hold the hooks 30 at the ends of the groove against the side panels 26.

The hooks 30 of the container 12 are arranged so that the noses 36 engage under the outer lips 18 of the grooves 16 in the upper surface 14 of the lower container 12. The material of which the hooks 30 is made is such that when pressure is applied to the container transversely to the grooves, the legs 34 of the hooks in one outer groove 20a will flex sufficiently to enable the noses 36b on the hooks 30b fitting the other outer groove 20b to move out from under the outer lip 18b of the groove 16b it engages so that the hooks 30b can disengage from the groove 16b. Movement of the container will thus disengage the other hooks and the two containers can be moved apart from one another. The rigidity of the legs 34 is, however, such that inadvertent disconnection is prevented. The wings 39 prevent too great flexing of the legs 34.

Connection of two containers is effected by aligning the hooks within the recesses and applying a sharp force to the upper container 12 so that the noses 39 snap into the grooves 16.

The height of the legs 34 is such that the two containers 10 and 12 will be spaced sufficiently for the necessary airflow to take place between the containers for cooling and other purposes as desired.

The educational desk or bench D has provided therein a plate 42 of the same outside configuration as the sides 14 and 19 so that the lowermost container 10 can be connected thereto in the same way as two containers 10 and 12 are connected.

Figure 4:
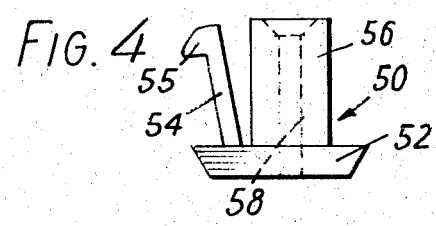
FIGS. 4 and 5 are respectively a side view and plan to a slightly greater scale of a modified engagement hook.
Figure 5:
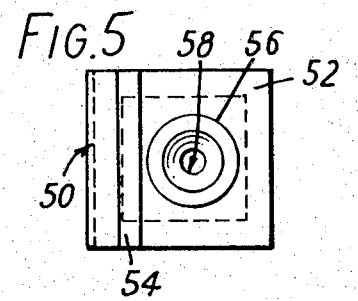

Instead of the hooks 30, hooks 50 may be used with the stackable containers 10 and 12. Each hook 50 is substantially identical with the hook 30 having an identical base 52 and leg 53 upstanding therefrom with a nose 55 running along the upper edge of the leg 54. The hook 50 has a cylindrical boss 56 extending upwardly from the centre of the base 52 to slightly above the upper edge of the leg 54. This boss 56 has a co-axial countersunk aperture 58 passing through the boss 56 and base 52 for a screw to pass so that the hook can be screwed to a container. Unlike the hook 30, the hook 50 does not have a wing 39. The hooks 50 are shown in FIGS. 4 and 5.

The hook 50 can be used in the same way as the hook 30 with the containers 10 and 12. However because the boss 56 is higher than the leg 54, these bosses constitute supporting means and the containers will be supported on the four bosses 56 instead of on the ends of the legs 54 as in the arrangements using the hooks 30.

We have found that the containers 10 and 12 connected as abovementioned will be securely held together to form a unit. When the containers 10 and 12 are connected to the plate 40 they will be secured to the desk D, with no, or very little, possibility of moving relative thereto inadvertently whilst being capable of being disconnected quickly and easily as mentioned above.

The invention is not limited to the precise constructional details hereinbefore described and illustrated. For example a stack comprising more containers can be built up in the same manner as described above. Further all the containers need not be of the same size of area in plan or side elevation, provided only that there will be a sufficient support for upper containers above the lower ones. Preferably however the containers are of modular construction to form a secure stack.

The hooks 30 and 50 may be held in position by having the bases bonded to the bases of the grooves. Alternatively they may be held in position by a dimple being formed in the lips or bases of the grooves. Yet again the hooks may be screwed to the underside of a container. The aperture 58 is provided in the boss 56 of the hook 50 for this purpose as described above. Similarly an aperture may be provided in the base 32 of the hook 30 for the same purpose. Where a bonding medium or a screw is used for holding a hook in position, the underside of the container may be plain and only the upper side of a container stacked as above described need be grooved. The top-most container could also have its upper edge plain. The stack may rest on a flat bench surface without plate 40 if desired. The shape and number of the grooves and the hooks may also vary as desired. The hooks 30 and 50 may be made of any material or materials including metals.

It will be understood that the sizes of various items shown in the drawings have been exaggerated in the interests of clarity.

We claim:

1. A parallelipipedical container comprising
   (a) at least two grooves extending along the length of each of its upper and lower sides,
   (b) each said groove having a base and a pair of inclined sides extending therefrom and leading to a lip that extends over the grooves,
   (c) end closure means at the ends of the grooves closing off the said ends of the grooves,
   (d) a pair of removable engagement means in each of the grooves on one of said sides of the container, each said engagement means, having a base contained within a groove, a narrow resilient leg extending from the base and lying parallel to the groove, and a nose at the end of the leg and
   (e) spacers respectively within the grooves on the upper side extending between and engaging the bases of the engagement means and holding them against the end closure means at the ends of the grooves.

2. A container as claimed in claim 1 in which the engagement means comprises supporting means extending upwardly from the base to above the height of the leg.

3. A container as claimed in claim 2 having a screw hole extending through the supporting means.

4. A container as claimed in claim 2 in supporting means is constituted by a boss of circular section.

5. An engagement member comprising
   (a) a flat base part having a first pair of parallel opposite sides and second sides joining the said first pair of sides,
   (b) a resilient leg integral with the base part and being of narrow elongated cross-section and having a pair of enlarged opposite side faces, the leg being upstanding from the base part, and extending between the said second sides with the said side faces lying parallel to the said first pair of opposite sides of the base part, the leg being located closer to one side of the said first pair of sides than the other side of said pair of sides but being spaced from the said one side, and
   (c) a nose integral with the leg and running along the entire length of the side face of the leg which is nearer to the said one side of the base part and near the end of that face remote from the base part.

6. An engagement member as claimed in claim 5 further comprising support means extending from the base part to a greater height than the leg.

7. An engagement member as claimed in claim 5 wherein the said sides are tapered outwardly to the part of the base from which the leg rises.

8. The combination of a first surface with an attachment surface wherein the attachment surface has a pair of parallel grooves therein, each groove having a base and a pair of side walls, at least said side walls of the two grooves which are opposite to one another being undercut and having lips overlying the undercut portions thereof and the first surface having at least four engagement members operatively connected thereto but not integral therewith, each said member comprising a base and a resilient leg having a nose thereon, the said legs being arranged in two pairs, with the legs of each pair entering one of the said grooves respectively and with the noses of such legs lying under the said lips, at least some of the legs being sufficiently resilient to accommodate relative movement of the noses to permit the noses to move past the lips.

9. The combination claimed in claim 8 in which the said first surface forms one face of a container.

10. The combination claimed in claim 8 or 9 in which the said abutment surface forms one face of a container.

11. The combination claimed in claim 8 in which the said grooves are of inverted dove-tail section.

12. The combination as claimed in claim 8 further comprising means operatively connected to the attachment surface closing off the ends of the grooves.

13. The combination claimed in claim 8 wherein the bases of the engagement members are secured to the said first surface.

14. The combination claimed in claim 8 wherein each engagement member comprises a support member rising from the base and being independent of the leg, which support member engages the base of a groove.

15. The combination claimed in claim 14 in which the end of the leg of the said attachment member is spaced from the said base of the said groove.

16. The combination claimed in claim 8 in which the said first surface comprises a pair of grooves in which the base of each engagement member is received and retained in the groove.

17. The combination claimed in claim 8 in which the resilience of each leg is greater adjacent the base.

18. The combination of claim 17 in which a reinforcing wing extends from and transversely to the leg, the wing terminating short of the base.

19. The combination of claim 8 in which the said surface lie parallel to one another.

20. An engagement member as claimed in claim 6 in which the support means is circular in section.

21. An engagement member as claimed in claim 5 in which the said second sides are straight, parallel to one another and lie at right angles to the said first pair of opposite sides.

22. An engagement member as claimed in claim 5 in which the resilience of the leg is greatest near the base part.

23. An engagement member as claimed in claim 22 in which a wing is provided on the leg projecting transversely thereto from the side face opposite to the side face on which the nose is formed, the said wing extending from the free end of the leg and terminating short of the base part.

24. An engagement member comprising:
(a) a flat base part,
(b) a resilient leg integral with the base part being of narrow elongated cross-section and having a pair of elongated enlarged opposite side faces, the leg being upstanding from the base part,
(c) a nose integral with the leg and running along one side face thereof, and
(d) support means upstanding from the base part and extending to a greater height than the leg.

25. The combination claimed in claim 8 in which the said undercut side walls are the side walls of the two grooves that are most remote from one another.

26. The combination of a first surface, an attachment surface and engagement members wherein the attachment surface has a pair of oppositely facing wall means which are undercut and have lips overlying the undercut portions thereof, and the engagement members are operatively connected to but not integral with the first surface, each said member comprising a base and a resilient leg having a nose thereon, the said members being arranged with the noses facing in opposite directions and lying under the said lips, at least some of the legs being sufficiently resilient to accommodate relative movement of the noses toward each other to permit the noses to move past the lips.

27. The combination of claim 26 in which there are four engagement members arranged—two pairs with the legs of each pair of engagement members being aligned.

* * * * *